United States Patent
Rong et al.

(10) Patent No.: US 11,475,196 B2
(45) Date of Patent: Oct. 18, 2022

(54) ENCRYPTION HYBRID MODEL SI SIMULATION METHOD BASED ON ADS AND HSPICE

(71) Applicant: ZHENGZHOU YUNHAI INFORMATION TECHNOLOGY CO., LTD., Henan (CN)

(72) Inventors: Shili Rong, Henan (CN); Ning Wu, Henan (CN); Long Sun, Henan (CN); Wei Wang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 946 days.

(21) Appl. No.: 16/097,185

(22) PCT Filed: Nov. 30, 2017

(86) PCT No.: PCT/CN2017/113862
§ 371 (c)(1),
(2) Date: Oct. 26, 2018

(87) PCT Pub. No.: WO2019/033613
PCT Pub. Date: Feb. 21, 2019

(65) Prior Publication Data
US 2019/0325101 A1 Oct. 24, 2019

(30) Foreign Application Priority Data
Aug. 14, 2017 (CN) .......................... 201710691662.1

(51) Int. Cl.
*G06F 30/367* (2020.01)
*G06F 21/62* (2013.01)

(52) U.S. Cl.
CPC ........ *G06F 30/367* (2020.01); *G06F 21/6209* (2013.01)

(58) Field of Classification Search
CPC .......... G06F 30/33; G06F 30/30; G06F 30/36; G06F 30/367; G06F 21/6209
See application file for complete search history.

(56) References Cited

U.S. PATENT DOCUMENTS

| 2003/0125914 A1 | 7/2003 | Du |
| 2013/0041645 A1 | 2/2013 | Kawata |

(Continued)

FOREIGN PATENT DOCUMENTS

| CN | 1691020 A | 11/2005 |
| CN | 104143024 A | 11/2014 |

(Continued)

OTHER PUBLICATIONS

Dghais et al. Reduced-Order Parametric Behavior Model for Digital Buffers/Drivers With Physical Support IEEE Transactions on Component Packaging and Manufacturing Technology, vol. 2, No. 12, Dec. 2012 (Year: 2012).*

(Continued)

*Primary Examiner* — Rehana Perveen
*Assistant Examiner* — Cuong V Luu
(74) *Attorney, Agent, or Firm* — Yue (Robert) Xu

(57) ABSTRACT

It is provided an encryption hybrid model SI simulation method based on an ADS and an HSPICE. The method includes: extracting step response data of a TX end chip encryption model by using HSPICE transient simulation; externally generating a random code signal; and taking the extracted step response data and the random code signal as input sources of ADS channel simulation, to realize active simulation to the encryption hybrid model.

4 Claims, 1 Drawing Sheet

(56) References Cited

U.S. PATENT DOCUMENTS

2014/0025350 A1    1/2014   Dai et al.
2014/0092952 A1    4/2014   Aguilar-Arreola

FOREIGN PATENT DOCUMENTS

CN    104583988 A    4/2015
CN    107292066 A    10/2017

OTHER PUBLICATIONS

Bhargava et al. EMI Prediction in Switched Power Supplied by Full-Wave and Non-Linear Circuit Co-Simulation 978-1-4244-4267-6, IEEE 2009 (Year: 2009).*
Pillage et al. Asymptotic Waveform Evaluation for Timing Analysis IEEE Transactions on Computer-Aided Design, vol. 9 No.4, Apr. 1990 (Year: 1990).*
Sullivan et al. Keysight Technologies Simulating High-Speed Serial Channels with IBIS-AMI Models Aug. 1, 2014 (Year: 2014).*
International Search Report for PCT/CN2017/113862 dated Mar. 19, 2018, ISA/CN.

* cited by examiner

ENCRYPTION HYBRID MODEL SI SIMULATION METHOD BASED ON ADS AND HSPICE

The present application is a national phase application of PCT international patent application PCT/CN2017/113862, filed on Nov. 30, 2017 which claims the priority to Chinese Patent Application No. 201710691662.1, titled "ENCRYPTION HYBRID MODEL SI SIMULATION METHOD BASED ON ADS AND HSPICE", filed on Aug. 14, 2017 with the State Intellectual Property Office of People's Republic of China, both of which are incorporated herein by reference in their entireties.

FIELD

The present disclosure relates to the technical field of signal integrity simulation, and particularly to an encryption hybrid model SI simulation method based on an ADS and an HSPICE.

BACKGROUND

In the design of a traditional digital system, a high speed interconnection phenomenon is often negligible, because it has a weak impact on the performance of the system. However, with the continuous development of computer technology, in many factors that determine the performance of the system, the high speed interconnection phenomenon is playing a leading role, and often results in the emergence of some unforeseen problems, which increase the complexity of the system design greatly. A design engineer has to use an appropriate method and analysis simulation tool in early design stage to assess the feasibility and risk points of the system design in advance, and optimize the design based on the simulation result, to improve success rate of the system design and shorten a development cycle.

In a simulation process of the early design stage, a chip model needs to be provided by the chip manufacturers to complete a link evaluation of the system design. However, some chip manufacturers encrypt the chip models for technical protection purposes. There are also some cases that the chip manufacturers provide wrong type of chip models. These cases may increase difficulty of simulation, reduce accuracy of simulation, and even make the simulation unable to be performed normally, such that link characteristics of the system design cannot be evaluated effectively and the design risk is increased.

For the problem of chip model inconsistency or chip model encryption, an approximation method is usually used. That is, a universal chip model is used to approximately replace the chip model in the link, to approximately assess the link characteristics of the system design.

For example, in one link, the transmitting end chip is an encryption SPICE model, the receiving end chip is an IBIS AMI model. Since some encryption SPICE models cannot be called by advanced design system (ADS), in a channel simulation based on an ADS software, the encryption SPICE model may be approximately replaced by the universal chip model. Some parameters are set such that the characteristics of the universal model are similar to the characteristics of the encryption SPICE model, and then link simulation is completed.

Although this approximation can realize link simulation, it cannot guarantee the accuracy of the simulation. Especially when the link margin is very small, this simulation method is not very meaningful.

In addition, some chip manufacturers provide a chip model with a special characteristic which cannot be approximately replaced by the universal chip model, such that the link simulation cannot be performed normally. Risk evaluation may be performed only based on experience, which results in an obviously unreliable and unreasonable design.

SUMMARY

An encryption hybrid model signal integrity (SI) simulation method based on an ADS and an HSPICE is provided according to an embodiment of the present disclosure, to solve the problem that the simulation result is distorted or the link simulation cannot be completed in the SI simulation in the early design stage of high speed circuit because the chip model provided by the manufacturer is encrypted or inconsistent with other model types.

The technical solutions adopted by the present disclosure are described as follows.

An encryption hybrid model SI simulation method based on an ADS and an HSPICE, includes:

extracting step response data of a TX end chip encryption model by using HSPICE transient simulation;

externally generating a random code signal; and taking the extracted step response data and the random code signal as input sources of ADS channel simulation, to realize active simulation to the encryption hybrid model.

The HSPICE transient simulation includes:

reserving a model input interface in the TX end chip encryption model;

building a wiring model required in a link;

connecting the TX end chip encryption model and the wiring model, and providing the connected model in butt joint with a resistor;

inputting an ideal step signal at the model input interface reserved in the TX end chip encryption model; and extracting the step response data at a position where the butt joint is provided.

The step response data is a step response output file with a suffix of .lis. A format of the file is edited to make the file to be a file with a suffix of .tim that is capable of being called by the ADS.

The method further includes: transforming the wiring model into an S parameter for the ADS to call.

The advantageous effects of the embodiments of the present disclosure are as follows.

The method according to the embodiments of the present disclosure can effectively solve the problem that signal integration simulation cannot be accurately performed or cannot be performed because the types of encryption models provided by the manufacturer are not consistent. It is ensured that link quality analysis can be performed according to different types of encryption models. The system design risk can be assessed based on a simulation result and a corresponding improvement can be made, unnecessary time and expense cost are reduced, and design success rate of the system is greatly improved.

DETAILED DESCRIPTION

The embodiments of the present disclosure are described in conjunction with drawings.

A first embodiment

In the present disclosure, step response data of a TX end chip encryption model is extracted by using HSPICE transient simulation.

HSPICE software can be compatible with many major electronics design automation (EDA) tools, such as Cadence and Workview, and can provide many important circuit simulation and design results for integrated circuit performance. The circuit can be accurately simulated, analyzed and optimized in a microwave frequency range from direct current to 100 GHz by using the HSPICE software. In practice, the HSPICE software can provide key circuit simulation and design plan. When the HSPICE software is used to simulate the circuit, a scale of the circuit depends only on an actual memory capacity of the computer of the user.

Figure 1:
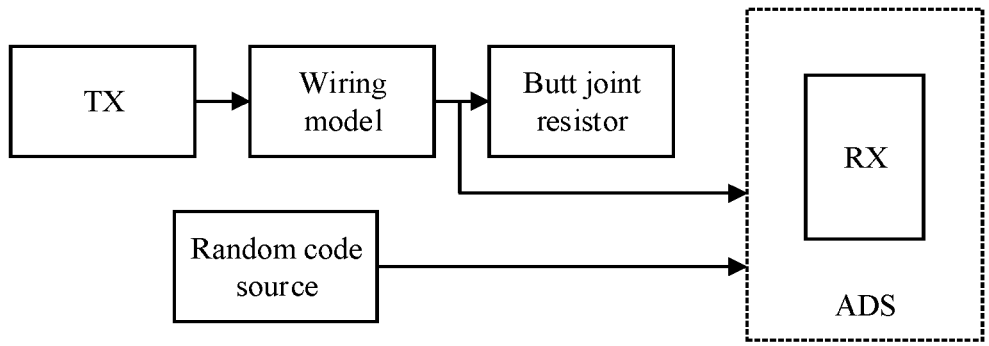
FIG. 1 is a schematic view of a simulation link of an encryption hybrid model.

As illustrated in FIG. 1, TX end chip and RX end chip are simulated by using an SPICE model and an IBIS AMI model respectively. The TX end SPICE model is an RC circuit. A wiring model is a PCB wiring with a length of 5 inches. The TX end SPICE model is an encryption model.

A model input interface is reversed in the TX end SPICE model.

The TX end SPICE model is connected with the 5 inches wiring model. A butt joint resistor with the resistance of 50 ohm is connected to the other end of the wiring model. The wiring model may be transformed into an S parameter for the ADS to call.

After inputting an ideal step signal at the model input interface reversed in the TX end SPICE model, the step response data may be extracted at a position where the butt joint resistor is provided.

The step response data is a step response output file with a suffix of .lis. A format of the file is edited to make the file to be a file with a suffix of .tim that is capable of being called by the ADS.

A random code signal is generated externally. The extracted step response data and the random code signal are taken as input sources of ADS channel simulation, to realize active simulation to the encryption hybrid model.

The method according to the embodiments of the present disclosure can effectively solve the problem that signal integration simulation cannot be accurately performed or cannot be performed because the types of encryption models provided by the manufacturer are not consistent. It is ensured that link quality analysis can be performed according to different types of encryption models. The system design risk can be assessed based on a simulation result and a corresponding improvement can be made, unnecessary time and expense cost are reduced, and design success rate of the system is greatly improved.

Effectiveness of a simulation result of the encryption hybrid model SI simulation based on the HSPICE and ADS transient simulation is verified as follows.

The HSPICE simulation is described hereinafter.

A TX end SPICE model is a normal unencrypted model.

The SPICE model is imported based on an Spice Wizard function of the ADS.

An input interface of the model is reversed to input the step signal outside the model.

A link model is built herein. A 5 inches wiring model is built. Because of different extraction manners of the wiring model in actual projects, the wiring model may be transformed into an S parameter for the ADS to call.

Figure 2:
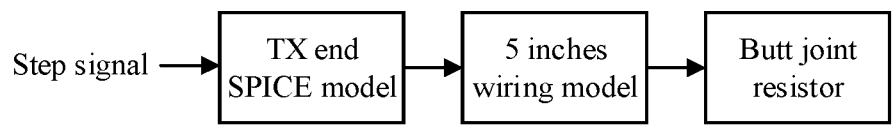
FIG. 2 is a schematic view of butt jointing of a wiring model of an SPICE model.

As illustrated in FIG. 2, the imported SPICE model and the 5 inches wiring model are connected. A 50 ohm butt joint resistor is jointed at the end of the link. An ideal step signal is inputted at the input interface reversed in the SPICE model. Amplitude of the signal is determined by characteristics of the chip. Simulation time is set so that step response output can reach a steady state. A simulation time interval is set to guarantee calculation accuracy. Step response data is extracted at a position where the butt joint resistor is provided. The step response data includes the characteristics of the TX end chip and the link.

Figure 3:
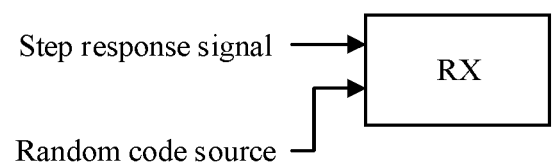
FIG. 3 is a schematic view of signal inputting of an RX chip.

As illustrated in FIG. 3, the above step response data is imported into the ADS channel simulation as a signal source of the RX end chip, and a random code signal is applied externally. Correlation parameters, such as simulation frequency, code source type and equalization, are set for the channel simulation, to obtain an eye pattern of a front end of the RX end chip. The parameters are determined by an actual situation.

It should be noted that the step response data includes the characteristics of the TX end chip and the link. The random code signal is used for generating the eye pattern.

The ADS transient simulation is described hereinafter. The random code signal is applied directly to the TX end chip to obtain an eye pattern of the front end of the RX end chip.

Since IBIS AMI model cannot be applied to the ADS transient simulation, the obtained eye patterns of the front end of the RX end chip may be compared. Since there is a butt joint in the RX end chip, if the eye patterns are consistent, eye patterns after passing a balanced circuit in the chip are also consistent.

As compared with transient simulation results of HSPICE and ADS, it can be seen that the simulation result based on the step response and the result based on ADS transient simulation are almost identical, which proves an effectiveness of channel simulation by using step response of a chip.

The embodiments are only used to describe the present disclosure, and should not be interpreted as limitation to the present application. Those skilled in the art can make many changes and variations without departing from the spirit and scope of the present disclosure. Therefore, all equivalent technical solutions belong to the scope of the present disclosure, and the patent protection scope of the present disclosure should be defined by the claims.

The invention claimed is:

1. An encryption hybrid model signal integrity (SI) simulation method based on an Advance Design System (ADS) and an HSPICE, performed by an SI simulation device, the method comprising:
   extracting step response data of a transmitter (TX) end chip encryption model by using HSPICE transient simulation;
   externally generating a random code signal; and
   performing ADS channel simulation by taking the extracted step response data and the random code signal as input sources of the ADS channel simulation, to realize active simulation to the encryption hybrid model,
   wherein the HSPICE transient simulation comprises:
   reserving a model input interface in the TX end chip encryption model;
   building a wiring model required in a link;

connecting the TX end chip encryption model and the wiring model, and providing the connected model in butt joint with a resistor;

inputting an ideal step signal at the model input interface reserved in the TX end chip encryption model; and extracting the step response data at a position where the butt joint is provided.

2. The encryption hybrid model SI simulation method based on the ADS and the HSPICE according to claim 1, wherein the step response data is a step response output file with a suffix of and a format of the step response output file is edited to make the step response output file to be a file with a suffix of .tim that is capable of being called by the ADS.

3. The encryption hybrid model SI simulation method based on the ADS and the HSPICE according to claim 1, further comprising:

transforming the wiring model into an S parameter for the ADS to call.

4. The encryption hybrid model SI simulation method based on the ADS and the HSPICE according to claim 3, further comprising:

transforming the wiring model into an S parameter for the ADS to call.

\* \* \* \* \*